(12) United States Patent
Sahr et al.

(10) Patent No.: US 6,367,406 B1
(45) Date of Patent: Apr. 9, 2002

(54) BOAT AND METHOD FOR MANUFACTURING USING RESIN TRANSFER MOLDING

(75) Inventors: Ronald C. Sahr, Randall; Michael D. Nelson, Little Falls; Robert L. Retka, Long Prairie, all of MN (US)

(73) Assignee: Larson/Glastron Boats, Inc., Minneapolis, MN (US)

( * ) Notice: Subject to any disclaimer, the term of this patent is extended or adjusted under 35 U.S.C. 154(b) by 0 days.

(21) Appl. No.: 09/664,019

(22) Filed: Sep. 19, 2000

Related U.S. Application Data
(60) Provisional application No. 60/156,052, filed on Sep. 24, 1999.

(51) Int. Cl.[7] .................................................. B63B 5/24
(52) U.S. Cl. ................................................... 114/357
(58) Field of Search .................................. 114/357, 355

(56) References Cited

U.S. PATENT DOCUMENTS

| | | |
|---|---|---|
| 2,909,791 A | 10/1959 | Malary, Jr. |
| 3,840,926 A | 10/1974 | Stoeberl |
| 3,848,284 A | 11/1974 | Livingston |
| 4,214,332 A | 7/1980 | Stoner |
| 4,676,041 A | 6/1987 | Ford |
| 4,719,871 A | 1/1988 | Fantacci et al. |
| 4,762,740 A | 8/1988 | Johnson et al. |
| 4,778,420 A | 10/1988 | Greenberg |
| 4,891,176 A | 1/1990 | Drysdale et al. |
| 4,955,839 A | 9/1990 | Kaschper |
| 5,020,846 A | 6/1991 | Bonnett |
| 5,035,602 A | 7/1991 | Johnson |
| 5,036,790 A | 8/1991 | Berryer |
| 5,045,251 A | 9/1991 | Johnson |
| 5,061,542 A | 10/1991 | Brace |
| 5,063,870 A | 11/1991 | Wagner |
| 5,069,414 A | 12/1991 | Smith |
| 5,173,227 A | 12/1992 | Ewen et al. |
| 5,458,844 A | 10/1995 | MacDougall |
| 5,526,767 A * | 6/1996 | McGuiness et al. ........ 114/357 |
| 5,558,038 A | 9/1996 | McNamara |
| 5,567,499 A | 10/1996 | Cundiff et al. |
| 5,569,508 A | 10/1996 | Cundiff |
| 5,615,508 A | 4/1997 | Miller et al. |
| 5,634,425 A * | 6/1997 | MacDougall ............... 114/357 |
| 5,721,034 A | 2/1998 | Seemann, III et al. |

(List continued on next page.)

FOREIGN PATENT DOCUMENTS

JP 57-18586 * 1/1982 .................. 114/357

*Primary Examiner*—S. Joseph Morano
*Assistant Examiner*—Andrew Wright
(74) *Attorney, Agent, or Firm*—Merchant & Gould P.C.

(57) ABSTRACT

One aspect of the present invention relates to a method for making a boat. The boat includes a port side positioned opposite from a starboard side. The boat also includes a floor and stingers supports positioned within the hull. The method includes providing a insert having two spaced-apart elongated portions interconnected by at least two spaced-apart transverse portions that extend between the elongated portions. The elongated portions are sized and relatively positioned for one of the elongated portions to extend along the port side of the hull and the other of the elongated portions to extend along the starboard side of the hull. The method also includes positioning the insert in a chamber defined between a male mold piece and a female mold piece. The method further includes providing fibrous reinforcing material that surrounds the insert within the chamber. The fibrous reinforcing material includes portions positioned between the male mold piece and the insert, and also includes portions positioned between the female mold piece and the insert. The method further includes transferring resin into the chamber between the male and female mold pieces such that the resin envelops the fibrous reinforcing material, and curing the resin within the chamber. As the resin cures, the resin enveloped fibrous reinforcing material hardens to form the hull, the floor and the support stringers of the boat.

7 Claims, 6 Drawing Sheets

U.S. PATENT DOCUMENTS

| | | |
|---|---|---|
| 5,753,151 A | 5/1998 | McBride |
| 5,837,185 A | 11/1998 | Livesay et al. |
| 5,851,336 A | 12/1998 | Cundiff et al. |
| 5,875,731 A | 3/1999 | Abernethy et al. |
| 5,904,972 A | 5/1999 | Tunis, III et al. |
| 5,971,742 A | 10/1999 | McCollum et al. |
| 6,032,606 A * | 3/2000 | Fulks ........................ 114/357 |
| 6,143,215 A | 11/2000 | McCollum et al. |

* cited by examiner

BOAT AND METHOD FOR MANUFACTURING USING RESIN TRANSFER MOLDING

CROSS-REFERENCE TO RELATED APPLICATIONS

This application claims priority to U.S. Provisional Application Ser. No. 60/156,052, filed on Sep. 24, 1999.

FIELD OF THE INVENTION

The present invention relates generally to boats. More particularly, the present invention relates to boats having hulls with strengthened by fibrous reinforcing material and to methods for manufacturing such boats.

BACKGROUND OF THE INVENTION

Boat hulls have historically been made of many different types of material such as aluminum, steel or wood. Another common material used in the manufacture of boat hulls is a laminate material made of fiberglass-reinforced resin.

Open face molds are frequently used to manufacture fiberglass hulls. To make a hull with an open face mold, a layer of gel coat is frequently first applied to the mold. Next, a barrier layer is often applied to the gel coat. Finally a layer of fiberglass-reinforced resin is applied to the barrier layer. When the hull is removed from the mold, the gel coat provides a smooth, aesthetically pleasing outer surface of the hull. The barrier layer prevents the fiberglass from printing or pressing through the gel coat. The fiberglass provides the hull with structural rigidity. Additional rigidity is typically provided to the hull by stringer and flooring structures that are subsequently mounted within the hull.

Conventional techniques for manufacturing fiberglass boats involve a number of separate, time consuming process steps. What is needed is a more efficient process for manufacturing boats made of fibrous reinforcement material.

SUMMARY OF THE INVENTION

One aspect of the present invention relates to a method for making a boat. The boat includes a port side positioned opposite from a starboard side. The boat also includes a floor and stingers supports positioned within the hull. The method includes providing a insert having two spaced-apart elongated portions interconnected by at least two spaced-apart transverse portions that extend between the elongated portions. The elongated portions are sized and relatively positioned for one of the elongated portions to extend along the port side of the hull and the other of the elongated portions to extend along the starboard side of the hull. The method also includes positioning the insert in a chamber defined between a male mold piece and a female mold piece. The method further includes providing fibrous reinforcing material that surrounds the insert within the chamber. The fibrous reinforcing material includes portions positioned between the male mold piece and the insert, and also includes portions positioned between the female mold piece and the insert. The method further includes transferring resin into the chamber between the male and female mold pieces such that the resin envelops the fibrous reinforcing material, and curing the resin within the chamber. As the resin cures, the resin enveloped fibrous reinforcing material hardens to form the hull, the floor and the support stringers of the boat.

A variety of advantages of the invention will be set forth in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
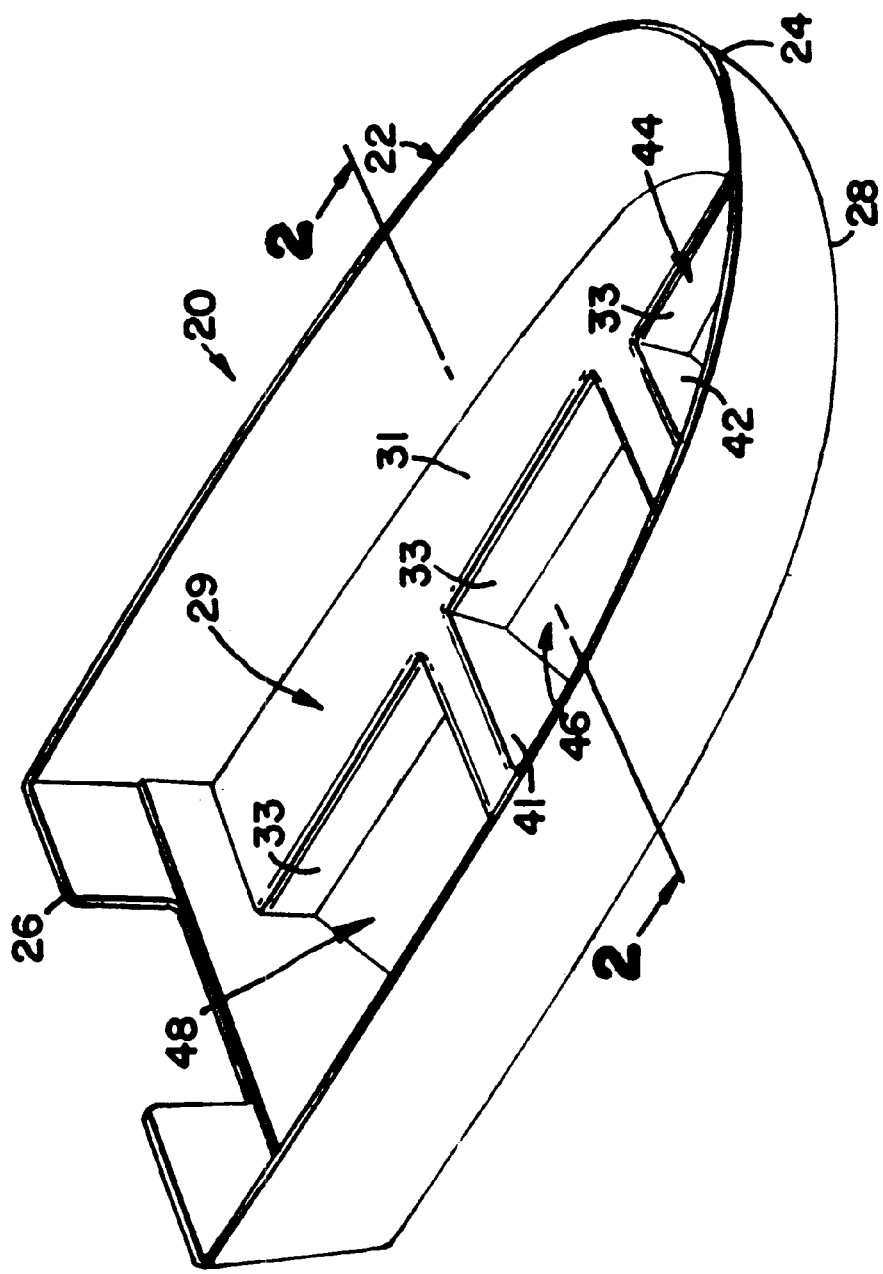
FIG. 1 is a perspective view of a boat constructed in accordance with the principles of the present invention.

FIG. 1 is a perspective view of a boat 20 constructed in accordance with the principles of the present invention. The boat 20 includes a hull 22 including a bow 24 positioned opposite from a stern 26. A keel 28 extends between the bow 24 and the stern 26. Chines 30 and strakes 27 (best shown in FIG. 2) are located on port and starboard sides of the hull 22. The boat 20 also includes a support structure 29 positioned within the hull 22. The support structure 29 includes a generally planar, horizontal platform or floor 31. The support structure 29 also includes first and second transverse supports 41 and 42. The supports 41 and 42 extend widthwise across the hull 22 and are configured for providing structural reinforcement to the hull 22. The support structure 29 further includes longitudinal stringer supports. For example, the support structure includes port and starboard stringer supports in the form of upright walls 33 that extend along the length of the hull 22 in a direction generally parallel to the keel 28. The terms "stringer" and "support stringer" are intended to include any type of member that extends lengthwise along the hull 22 to provide longitudinal reinforcement or support to the hull 22.

Still referring to FIG. 1, the support structure 29 also defines a plurality of internal compartments. For example, the support structure 29 defines a front storage compartment 44 positioned in front of the second transverse support 42, a middle fuel-tank compartment 46 positioned between the first and second supports 41 and 42, and a rear engine compartment 48 positioned behind the first support 41. The upright walls 33 of the support structure 29 define side walls of the compartments 44, 46 and 48. For example, the upright walls 33 shown in FIG. 2 define side walls of the middle fuel tank compartment 46. The front and middle compartments 44 and 46 preferably can be covered with removable panels (not shown).

Figure 2:
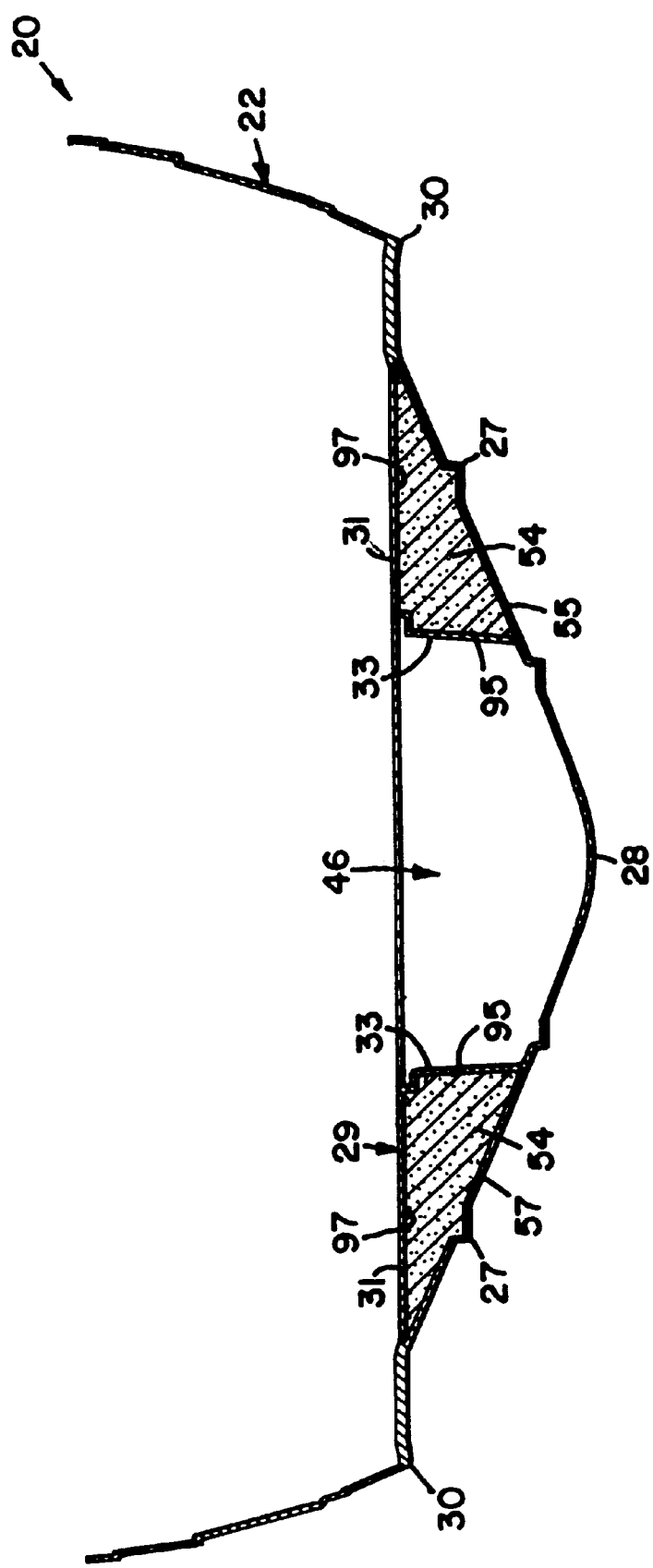
FIG. 2 is a cross-sectional view taken along section line 2—2 of FIG. 1.

Still referring to FIG. 2, a foam chamber 54 is defined between the support structure 29 and the hull 22. The foam chamber 54 has a size and shape that corresponds to a pre-formed buoyant insert 90 (shown in FIG. 3). As shown in FIG. 2, the foam chamber 54 includes starboard and port regions 55 and 57 positioned on opposite sides of the keel 28. The starboard and port regions 55 and 57 each have generally triangular cross-sections. The hull 22, the floor 29 and the upright walls 33 cooperate to define the starboard and port regions 55 and 57 of the chamber 54.

In one particular non-limiting embodiment of the hull 22, the hull has an outer gel coat layer of about 0.024 inches, and intermediate barrier layer of about 0.035 inches, and an inner fiberglass layer of about 0.25–0.375 inches. The barrier layer prevents the fiberglass from pressing through the gel coat.

The support structure 29 and the hull 22 are preferably formed as a single, unitary or monolithic piece such that no seams or discontinuities are located between the two structures. For example, as shown in FIG. 2, adjacent the chines 30 the floor 31 merges with the hull 22 to provide a seamless connection. Similarly, the upright walls 33 (i.e., the longitudinal stringers) preferably merge with the hull 22 to provide a seamless connection. Preferably, no separate fasteners or adhesive are provided at the connection locations. Instead, the hull 22 and the support structure 29 are preferably made of a fiber reinforced plastic material, and the connection locations preferably consist of continuous, uninterrupted thicknesses of the fiber reinforced plastic material. The term "seamless" is intended to mean that the connection locations are provided by continuous, uninterrupted portions of fibrous reinforced plastic material.

Preferably, the support structure 29 and the hull 22 are simultaneously formed during a forming process such as an injection molding process or a resin transfer molding process. The phrase "resin transfer molding" is intended to include any type of molding process where a fibrous reinforcing material is positioned within a mold into which resin is subsequently introduced. U.S. Application Ser. No. 08/715,533 filed on Sep. 18, 1996 to issued U.S. Patent No. 5,971,742 and entitled Apparatus For Molding Composite Articles, which is hereby incorporated by reference, discloses an exemplary resin transfer molding process.

An important aspect of the present invention relates to a resin transfer molding method for making a boat such as the boat 20 of FIG. 1. Generally, the method includes placing a pre-formed buoyant insert into a molding chamber. Preferably, the insert is enclosed, covered or surrounded with layers or portions of fibrous reinforcing material. Similarly, at least portions of the mold are lined with fibrous reinforcing material. The method also includes transferring resin into the molding chamber such that the resin envelops the fibrous reinforcing material. By using a pre-formed insert within the mold, the support structure 29 and hull 22 of the boat 20 can be simultaneously molded as a single piece within the molding cavity.

Figure 3:
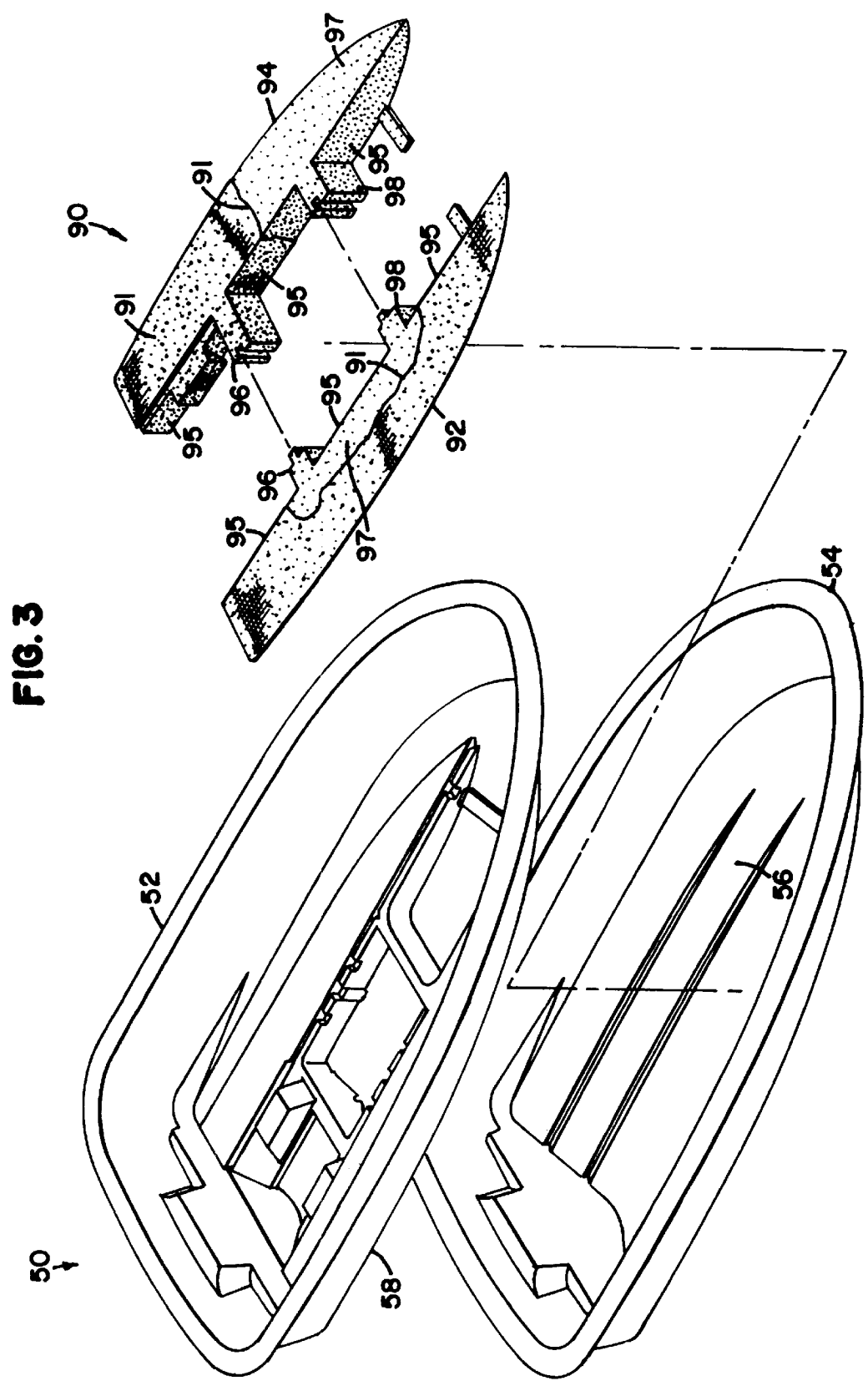
FIG. 3 illustrates a male mold piece, a female mold piece and a preformed insert adapted to be positioned between the mold pieces
Figure 4:
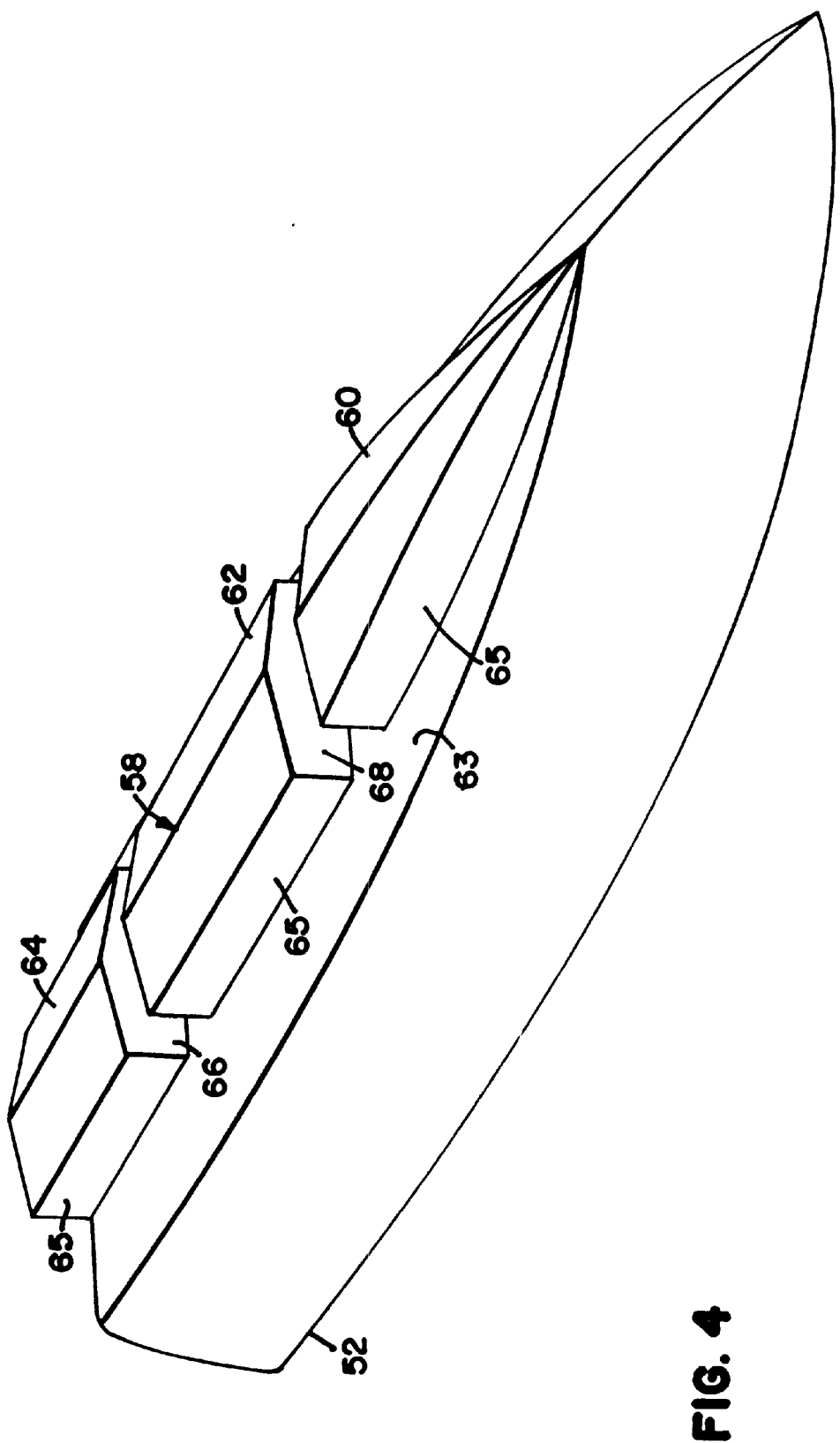
FIG. 4 is a perspective view of the underside of the male mold piece of FIG. 3.

FIG. 3 shows a mold 50 including a set of male and female mold pieces 52 and 54 suitable for use in manufacturing a boat such as the boat of FIG. 1. The male mold piece 52 nests within the female mold piece 54. The female mold piece 54 has a top surface 56 shaped in the inverse of the bottom side of the boat 20, and the male mold piece 52 has a bottom surface 58 shaped in the inverse of the top side of the boat 20. FIG. 4 shows a schematic/simplified view of the bottom surface 58 of the male mold piece 52. As shown in FIG. 4, the male mold piece 52 includes a front projection 60 that is the inverse of the front storage compartment 44, a middle projection 62 that is the inverse of the middle-fuel tank compartment, and a rear projection 64 that is the inverse of the rear engine compartment 48. A first slot or gap 66 corresponding to the first transverse support 41 of the boat 20 is located between the rear projection 64 and the middle projection 62. A second slot or gap 68 corresponding to the second transverse support 42 of the boat 20 is located between the middle projection 62 and the front projection 60. Side walls 65 of the projections 60, 62 and 64 correspond to the upright walls 33 of the support structure 29 of the boat. A planar surface 63 corresponds to the floor 31 of the support structure 29.

FIG. 3 also shows an insert 90 suitable for use in manufacturing the boat of FIG. 1. The insert 90 is preferably made of a buoyant material (i.e., capable of floating in water) such as foam. Preferably, the insert 90 is covered, enclosed or otherwise surrounded by a fibrous reinforcing material 91. The fibrous reinforcing material can be affixed to the insert 90 (e.g., by adhesive) or loosely applied or laid about the insert 90.

Preferably, the insert 90 is pre-formed to include first and second spaced-apart elongated portions 92 and 94. The first elongated portion 92 is sized to extend along the starboard region 55 of the foam chamber 54 of the hull 22. Similarly, the second elongated portion 94 is sized to extend along the port region 57 of the foam chamber 54 of the hull 22. Each of the first and second elongated portions 92 and 94 preferably has a generally triangular transverse cross section. The elongated portions 92 and 94 also include inwardly facing surfaces 95 that face one another. The inwardly facing surfaces 95 are aligned in an upright orientation. As shown in FIG. 2, the inwardly facing surfaces 95 are configured to extend along the upright walls 33 of the support structure 29 after the boat 20 of FIG. 1 has been manufactured. Planar top surfaces 97 of the elongated portions 92 and 94 are aligned at right angles with respect to the inwardly facing surfaces 95. As shown in FIG. 2, the top surfaces 97 are positioned beneath the floor 31 after the boat 20 has been manufactured.

Still referring to FIG. 3, the first and second elongated portions 92 and 94 are interconnected by first and second spaced-apart transverse portions 96 and 98 that extend between the inwardly facing surfaces 95 of the elongated portions 92 and 94. When the boat 20 of FIG. 1 has been manufactured, the transverse portions 96 and 98 are respectively positioned within the first and second supports 41 and 42 of the boat 20 (i.e., the transverse portions 96 and 98 are encased within a fiber reinforced plastic material to provide the supports 41 and 42). As shown in FIG. 3, the insert 90 has a two piece construction with the two pieces being interconnected by a tongue and groove type connection. However, in alternative embodiments, it will be appreciated that the insert 90 can be constructed as single piece of buoyant material.

Figure 5:
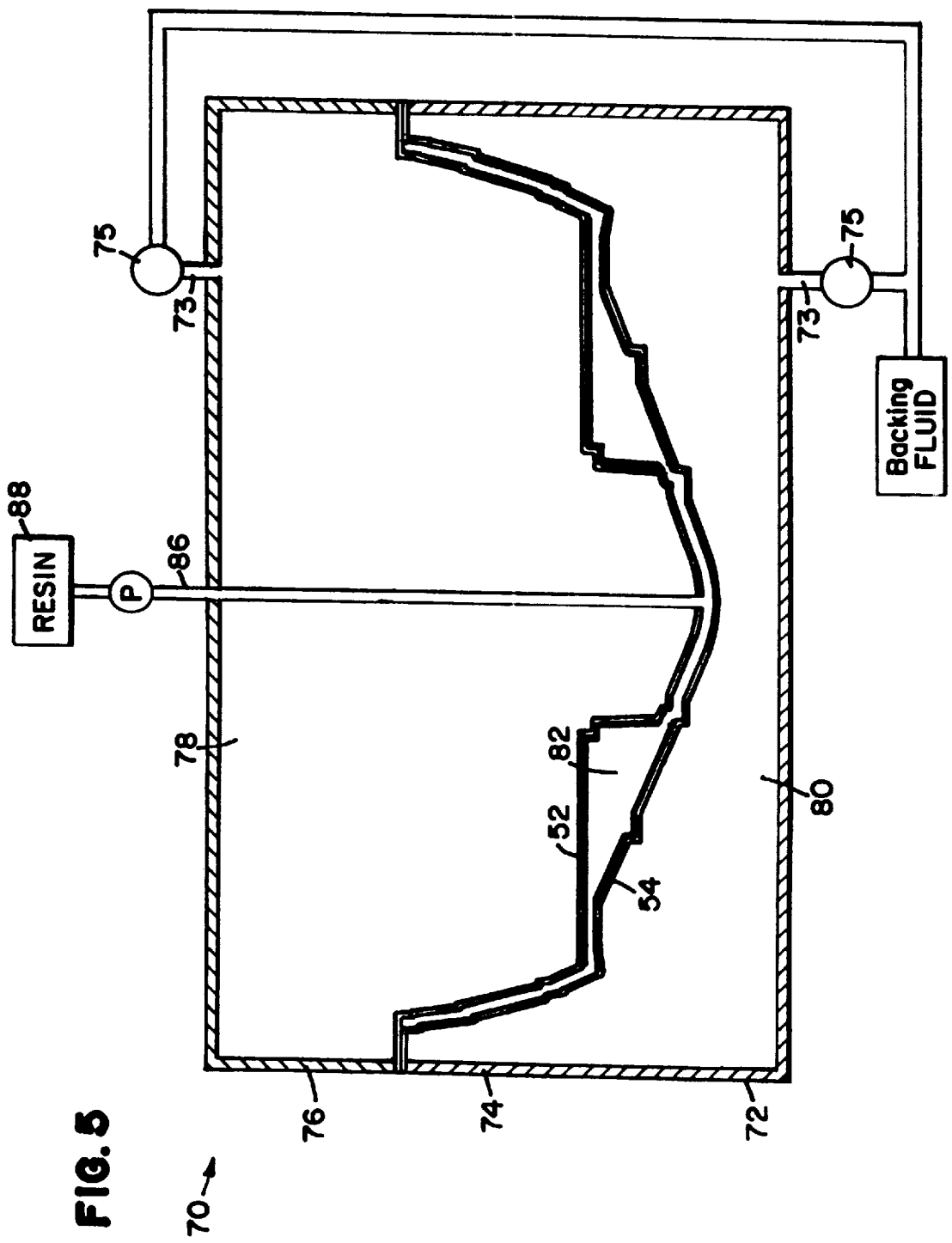
FIG. 5 is a schematic cross-sectional view of a resin transfer molding cell suitable for use in practicing the principles of the present invention.

FIG. 5 illustrates the male and female mold pieces 52 and 54 incorporated within a molding cell 70. The cell 70 includes a substantially rigid outer support housing 72 having a bottom portion 74 and a removable top portion 76. The male mold piece 52 is secured to the top portion 76 of the housing 72 and the female mold piece 54 is secured to the bottom portion 74 of the housing 72. A top fluid chamber 78 is defined between the top portion 76 and the male mold piece 52 and a bottom fluid chamber 80 is defined between the bottom portion 74 and the female mold piece 54. When the top portion 76 of the housing is mounted on the bottom portion 74 of the housing as shown in FIG. 5, a molding chamber 82 is defined between the male mold piece 52 and the female mold piece 54.

In the embodiment of FIG. 5, the mold pieces 52 and 54 are preferably semi-rigid membranes that are capable of at least slightly flexing when pressurized resin is injected into the mold chamber 82. In one particular embodiment, the male and female mold pieces 52 and 54 are made of sheets of metal. In other embodiments, the mold pieces 52 and 54 can be made of other materials such as fiberglass, plastic, reinforced nylon, etc. To prevent the mold pieces 52 and 54 from excessively deforming during the molding process, the top and bottom fluid chambers 78 and 80 are preferably filled with a non-compressible liquid such as water. In this regard, the top and bottom fluid chambers 78 and 80 preferably include inlets 73 for filling such chambers 78 and 80 with the non-compressible liquid. The inlets are preferably opened and closed by valves 75. By filling the top and bottom fluid chambers 78 and 80 with non-compressible liquid and then sealing the chambers 78 and 80, the liquid retained within the chambers 78 and 80 provides backing support to the mold pieces 52 and 54 such that deformation of the mold pieces 52 and 54 is resisted.

The cell 70 also includes structure for introducing resin into the molding chamber 82. For example, as shown in FIG. 5, the cell 70 includes an injection sprue 86 that extends through the top portion 76 of the housing 72 for injecting resin into the molding chamber 82. Preferably, the sprue 86 is placed in fluid communication with a source of resin 88 (e.g., a source of liquid thermoset resin) such that resin can be pumped from the source of resin 88 through the sprue 86 into the molding chamber 82. While a single sprue 86 has been shown in FIG. 5, it will be appreciated that multiple sprues can be provided through both the top and bottom portions 76 and 74 of the support housing 72 to provide uniform resin flow throughout the molding chamber 82.

It will be appreciated that the cell 70 can include a variety of additional structures for enhancing the molding process. For example, the cell 70 can include a heating/cooling mechanism for controlling the temperature of the fluid contained in the top and bottom fluid chambers 78 and 80. Additionally, the top and bottom fluid chambers 78 and 80 can include closeable vents for allowing air to be bled from the fluid chambers 78 and 80 as the fluid chambers are filled with liquid. Furthermore, the molding chamber 82 can include vents for bleeding resin from the molding chamber 82 once the molding chamber 82 has been filled with resin.

Figure 6:
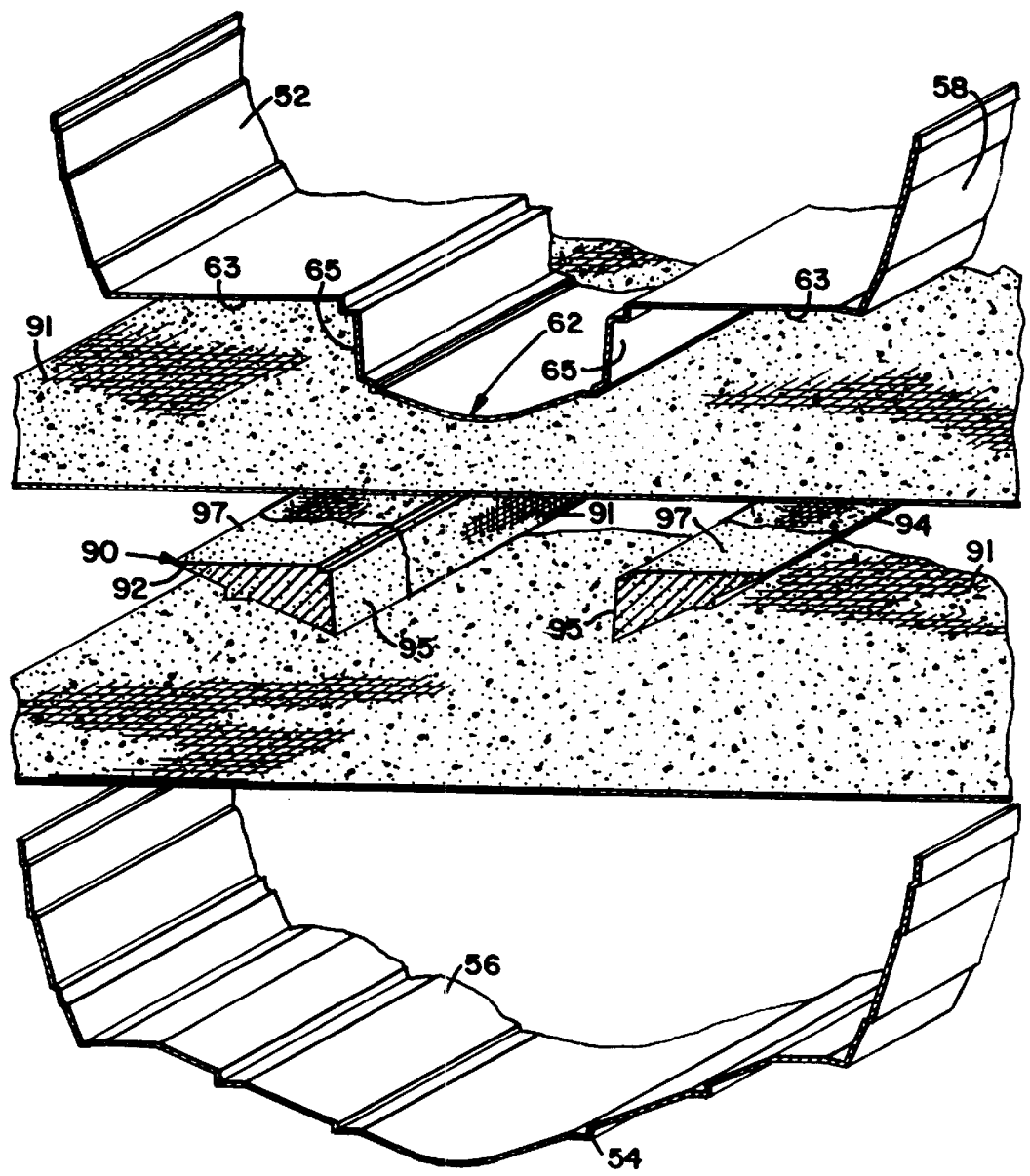
FIG. 6 is an exploded view of portions of the male and female mold pieces of FIG. 5 with fibrous reinforcing material and the pre-formed insert positioned between the mold pieces.

To manufacture a boat using the cell 70, the cell 70 is opened and the insert 90 of FIG. 3 is placed within the molding chamber 82. Preferably, fibrous reinforcing material 91 is provided that surrounds or covers the insert 90. Preferably, fibrous reinforcing material 91 is also laid below the insert 90 along the top surface 56 of the female mold 54, and above the insert 90 along the bottom surface 58 of the male mold 52. For example, FIG. 6 shows an exploded view of portions of the male and female mold pieces 52 and 54 with a first portion of the fibrous material 91 positioned between the insert 90 and the male mold piece 52, and a second portion of the fibrous reinforcing material 91 positioned between the insert 90 and the female mold piece 54. After the insert 90 and fibrous material 91 have been positioned in the cell 70, the cell 70 is closed such that the insert and the fibrous reinforcing material 91 are enclosed within the molding chamber 82. Thereafter, resin is injected or otherwise transmitted into the molding chamber 82 through the sprue 86.

Prior to the resin injection process, the top and bottom fluid chambers 78 and 80 of the cell 70 are preferably filled with non-compressible liquid. The filled chambers 78 and 80 provide back support to the mold pieces 52 and 54 such that deformation of the mold pieces 52 and 54 during the pressurized resin injection process is resisted.

When the cell 70 is closed, the transverse portions 96 and 98 of the insert 90 respectively fit within the first and second gaps 66 and 68 defined by the male mold piece 52. Additionally, the first and second elongated portions 92 and 94 of the insert 90 preferably are respectively positioned along port and starboard sides of the front, middle and rear projections 62, 64 and 66 of the male mold piece 52. Furthermore, the inwardly facing surfaces 95 of the insert 90 oppose the side walls 65 of the projections 60, 62 and 64 of the male mold 52. Moreover, the planar surface 63 of the male mold 52 opposes the planar top surfaces 97 of the insert 90.

After the cell 70 has been closed and the backing chambers 78 and 80 have been filled with fluid, the resin is injected or otherwise transferred into the mold chamber 82. As the resin enters the mold chamber 82, the resin envelops and impregnates the reinforcing material 91 contained within the mold chamber 82. Once the molding chamber 82 has been filled with resin, the resin within the chamber 82 is allowed to cure within the cell 70. As the resin cures, the resin enveloped fibrous reinforcing material hardens to form the support structure 29 and the hull 22 of the boat of FIG. 1. For example, resin enveloped fibrous material 91 positioned along the top surface 56 of the female mold 54 hardens to form the hull 22. Also, resin enveloped fibrous reinforcing material positioned between the inwardly facing surfaces 95 of the insert 90 and the side walls 65 of the projections 60, 62 and 64 of the male mold 52 forms the upright side walls 33 of the support structure 29. Additionally, resin enveloped fibrous reinforcing material positioned between the planar surface 63 of the male mold 52 and the planar top surfaces 97 of the insert 90 form the floor 31 of the support structure 29. Moreover, resin enveloped fibrous reinforcing material surrounding the transverse portions 96 and 98 of the insert 90 form the first and second supports 41 and 42 of the support structure 29.

By practicing the above described method, the support structure 29 and hull 22 can be simultaneously formed as a single seamless piece within the molding chamber 82. By forming the hull and support structure 29 as a single piece, numerous process steps typically required by prior art manufacturing techniques can be eliminated thereby greatly enhancing manufacturing efficiency.

To enhance the aesthetic appearance of the boat, the male and female mold pieces 52 and 54 are preferably coated with a layer of gel coat prior to enclosing the insert 90 and the fibrous reinforcing material 91 within the cell 70. Additionally, barrier coat layers are also preferably provided over the layers of gel coat for preventing the fibrous reinforcing material 91 from printing or pressing through the gel coat layers. An exemplary barrier coat layer is a layer of vinyl ester having a thickness of about 0.025 inches. Commonly, the gel coat layers can each have a thickness of about 0.020–0.024 inches.

It will be appreciated that additional structures/reinforcements can also be placed within the molding chamber 82 prior to injecting resin therein. For example, reinforcements such as plates for mounting seats, engine mount supports, and other reinforcements conventionally used in the boat manufacturing industry can be positioned at predetermined locations within the holding chamber prior to injecting resin therein. Preferably, the reinforcements are attached to the pre-formed insert 90 and positioned within the mold during the molding process. However, the reinforcements can be also be attached to the boat 20 after the hull 22 and the support structure 29 have been molded. This type of post-mold attachment procedure will typically involve milling certain locations of the boat 20 to facilitate mounting the reinforcements.

As shown in FIG. 3, the insert 90 is covered with a fibrous reinforcing material affixed to the insert 90 before the insert 90 has been placed in the cell 70. It will be appreciated that in alternative embodiments, the insert 90 can covered with fibrous reinforcing material by placing or laying the fibrous reinforcing material about the various features of the insert 90 within the cell 70. Also, it will be appreciated that the various material thicknesses shown in FIG. 6 are diagrammatic (i.e., not to scale), and that in actual practice the material thicknesses can be varied at different locations within the cell to provide the resultant boat with desired strength characteristics. For example, in certain embodiments, a thicker layer of fibrous reinforcing material can be used for the portion of the hull 22 located below the water line (i.e., below the chines 30) as compared to the portion of the hull 22 above the water line. Similarly, the thickness of fibrous reinforcing material can also be varied for the various components of the support structure 29.

While any number of different types of resins could be used in practicing the present invention, a preferred thermoset resin is a blended polyester resin sold by Reichold Manufacturing. Additionally, the fibrous reinforcing material can include any number of different types of material such as glass, graphite, aramid, etc. Furthermore, the fibrous reinforcing material can have a chopped configuration, a continuous configuration, a sheet configuration, a random configuration, a layered configuration or an oriented configuration.

With regard to the foregoing description, it is to be understood that changes may be made in detail, especially in matters of the construction materials employed and the shape, size and arrangement of the parts without departing from the scope of the present invention. For example, it will be appreciated that the various aspects of the present invention apply to resin transfer molding techniques that utilize rigid molds as well as semi-rigid molds. It is intended that the specification and depicted aspects be considered exemplary only, with a true scope and spirit of the invention being indicated by the broad meaning of the following claims.

What is claimed is:

1. A method for making a boat, the boat including a port side positioned opposite from a starboard side, the boat also including a floor and support stringers positioned within the hull, the method comprising:

providing an insert having two spaced-apart elongated portions interconnected by at least two spaced-apart transverse portions that extend between the elongated portions, the elongated portions being sized and relatively positioned for one of the elongated portions to extend along the port side of the hull and the other of the elongated portions to extend along the starboard side of the hull;

positioning the insert in a chamber defined between a male mold piece and a female mold piece;

providing fibrous reinforcing material that surrounds the insert within the chamber, the fibrous reinforcing material including portions positioned between the male mold piece and the insert, the fibrous reinforcing material also including portions positioned between the female mold piece and the insert;

transferring resin into the chamber between the male and female mold pieces such that the resin envelops the fibrous reinforcing material; and curing the resin within the chamber such that the resin enveloped fibrous reinforcing material hardens to form the hull, the floor and the support stringers of the boat.

2. The method of claim 1, wherein the floor, the hull and the support stringers are formed as a single, seamless piece.

3. The method of claim 1, wherein the floor, the hull and the support stringers are simultaneously formed within the chamber.

4. The method of claim 1, wherein resin enveloped fibrous reinforcing material hardens to form at least a pair of transverse supports that extend across a width of the hull along the transverse portions of the insert.

5. The method of claim 4, wherein the support stringers and the transverse supports cooperate to form internal compartments within the boat.

6. A boat comprising:
a) a hull;
b) a support structure positioned within the hull, the support structure including:
   i) a floor having an outer perimeter that is connected to the hull by a seamless connection;
   ii) support stringers having upper ends that are connected to the floor by seamless connections and lower ends that are connected to the hull by seamless connections; and
   iii) transverse supports that extend across a width of the hull between the support stringers; and
c) a buoyant insert positioned between the hull and the support structure.

7. The boat of claim 6, wherein the support stringers and the transverse supports cooperate to form internal compartments within the boat.

* * * * *